(12) United States Patent
Fang et al.

(10) Patent No.: US 11,911,734 B2
(45) Date of Patent: Feb. 27, 2024

(54) ELECTRICAL CONTROL SYSTEM FOR SLURRY MIXING

(71) Applicant: ZHEJIANG CANAAN TECHNOLOGY LIMITED, Wenzhou (CN)

(72) Inventors: Zheng Fang, Wenzhou (CN); Daowei Chen, Wenzhou (CN); Jianying Chen, Wenzhou (CN); Shaobo Chen, Wenzhou (CN); Guoqiao Wu, Wenzhou (CN)

(73) Assignee: ZHEJIANG CANAAN TECHNOLOGY LIMITED, Wenzhou (CN)

( * ) Notice: Subject to any disclaimer, the term of this patent is extended or adjusted under 35 U.S.C. 154(b) by 857 days.

(21) Appl. No.: 16/975,141

(22) PCT Filed: Jan. 10, 2020

(86) PCT No.: PCT/CN2020/071409
§ 371 (c)(1),
(2) Date: Aug. 24, 2020

(87) PCT Pub. No.: WO2020/199715
PCT Pub. Date: Oct. 8, 2020

(65) Prior Publication Data
US 2021/0237012 A1    Aug. 5, 2021

(30) Foreign Application Priority Data

Apr. 2, 2019  (CN) .......................... 201910260553.3

(51) Int. Cl.
*B01F 35/213* (2022.01)
*B01F 23/50* (2022.01)
*B01F 35/60* (2022.01)

(52) U.S. Cl.
CPC ............ *B01F 35/213* (2022.01); *B01F 23/59* (2022.01); *B01F 35/605* (2022.01); *B01F 23/581* (2022.01); *B01F 2215/0477* (2013.01)

(58) Field of Classification Search
CPC ............ B01F 2215/0477; B01F 35/213; B01F 35/605; B01F 23/581
(Continued)

(56) References Cited

U.S. PATENT DOCUMENTS

2003/0110101 A1* 6/2003 Friel .................... G06Q 10/087
705/28
2008/0165612 A1* 7/2008 Dykstra .............. B01F 35/2202
366/8
(Continued)

FOREIGN PATENT DOCUMENTS

CN        205672833 U    11/2016
CN        206627842 U    11/2017
(Continued)

*Primary Examiner* — Marc C Howell
(74) *Attorney, Agent, or Firm* — Bayramoglu Law Offices LLC

(57) ABSTRACT

An electrical control system for slurry mixing includes a processing module, an input module, a display module and an inspection module. The input module is configured to input the configuration information and send an action command and the configuration information to the processing module. The inspection module is configured to obtain the status information and send the status information to the processing module. The processing module is configured to receive the configuration information and the action command from the input module and the status information from the inspection module, form a production action according to the configuration information or the action command, and then send the configuration information, the action information and the status information to the display module. The display module is configured to receive the configuration
(Continued)

information, the action information and the status information, and display the configuration information, the action information and the status information.

9 Claims, 1 Drawing Sheet

(58) Field of Classification Search
USPC .......................................................... 366/142
See application file for complete search history.

(56) References Cited

U.S. PATENT DOCUMENTS

| | | | | |
|---|---|---|---|---|
| 2008/0165613 | A1* | 7/2008 | Dykstra | G05D 11/135 |
| | | | | 700/285 |
| 2013/0180717 | A1* | 7/2013 | Welker | B28C 7/0472 |
| | | | | 166/242.9 |
| 2014/0269144 | A1* | 9/2014 | Ayo | B01F 35/2134 |
| | | | | 366/8 |
| 2016/0291610 | A1 | 10/2016 | Kashima et al. | |

FOREIGN PATENT DOCUMENTS

| | | |
|---|---|---|
| CN | 207965690 U | 10/2018 |
| CN | 110262593 A | 9/2019 |

\* cited by examiner

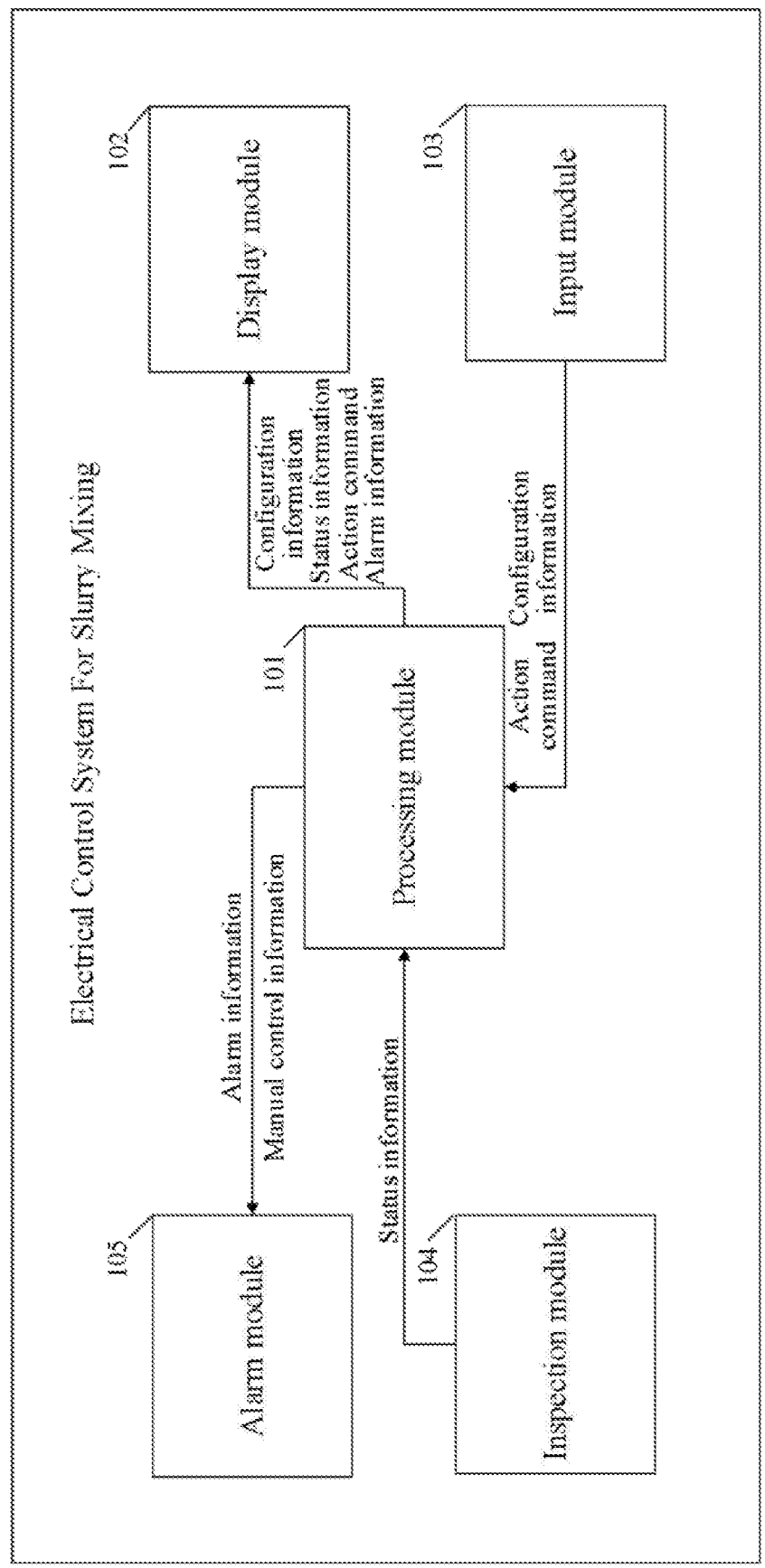

ELECTRICAL CONTROL SYSTEM FOR SLURRY MIXING

CROSS REFERENCE TO THE RELATED APPLICATIONS

This application is the national phase entry of International Application No. PCT/CN2020/071409, filed on Jan. 10, 2020, which is based upon and claims priority to Chinese Patent Application No. 201910260553.3, filed on Apr. 2, 2019, the entire contents of which are incorporated herein by reference.

TECHNICAL FIELD

The present invention relates to the field of slurry mixing control technology, in particular to an electrical control system for slurry mixing.

BACKGROUND

The operation of slurry mixing usually includes: placing the slurry powder in the slurry mixing tank, adding a certain amount of water, heating, stirring and mixing; then discharging the stirred gelatinized slurry into the slurry feeding tank, and cooling the slurry in the slurry feeding tank. The slurry mixing tank in the prior art usually has a large quantity of the slurry, so in order to improve the efficiency of cooling, it is needed to quantitatively discharge and cool the slurry. At present, such a process is treated manually. However, it is difficult to supervise the process of heating, stirring and discharging, and to monitor the overall situation of slurry mixing, thereby affecting the production and processing efficiency and easily causing the unnecessary waste of resources.

SUMMARY

In view of the disadvantages of the prior art, the present invention provides an electrical control system for slurry mixing, which effectively controls the slurry mixing device, and reduces labor costs. Moreover, the supervision is more effective than prior art devices, and is convenient to operate.

The present invention provides an electrical control system for slurry mixing, including a processing module, an input module, a display module and an inspection module. Specifically, the input module is configured to input the configuration information and send an action command and the configuration information to the processing module; the inspection module is configured to obtain the status information and send the status information to the processing module; the processing module is configured to receive the configuration information and the action command from the input module and the status information from the inspection module, form a production action according to the configuration information or the action command, and then send the configuration information, the action information and the status information to the display module; the display module is configured to receive the configuration information, the action information and the status information, and display the configuration information, the action information and the status information.

The advantages of this setting are as follows: the electrical control system for slurry mixing can effectively control the slurry mixing device and play an effective supervision role, which can reduce labor costs and is also easy to operate and use.

Further, the configuration information includes a heating temperature, a target temperature, a slurry separating mass and a water addition amount. The action command includes an oil injection instruction, a water adding instruction, a heating instruction, a slurry separating instruction, a cleaning instruction, a cooling stirring instruction and a slurry mixing stirring instruction. The status information includes an existing water quantity, a slurry mixing temperature, a cooling temperature and a slurry discharge quantity.

The advantages of this setting are as follows: in the above solution, the heating temperature refers to the water bath temperature or the oil bath temperature; the target temperature refers to the temperature reached by the material in the stirring cavity; the slurry separating mass refers to the mass of the slurry discharged into the slurry feeding tank after the slurry mixing is completed; the water addition amount refers to the mass of water that needs to be added in the slurry mixing process; the oil injection instruction refers to the starting of adding the heating oil or the stopping of adding the heating oil; the water adding instruction refers to the starting of adding the water or the stopping of adding the water; the heating instruction refers to the starting of heating the electric heating rod or the stopping of heating the electric heating rod; the slurry separating instruction refers to the opening of the valve to separate the slurry or the closing of the valve to stop separating the slurry; the cleaning instruction refers to the starting or stopping of the cleaning ball; the cooling stirring instruction refers to the starting of cooling and the stopping of cooling; the slurry mixing stirring instruction refers to the starting of slurry mixing and the stopping of slurry mixing; the existing water quantity refers to the mass of the added water; the slurry mixing temperature refers to the temperature of the slurry in the slurry mixing tank; the cooling temperature refers to the temperature of the slurry in the slurry feeding tank; the slurry discharge quantity refers to the mass of the slurry discharged into the slurry feeding tank.

Further, the processing module is further configured to generate a trend chart of the slurry mixing temperature according to the slurry mixing temperature and generate a trend chart of the cooling temperature according to the cooling temperature, and then send the trend chart of the slurry mixing temperature and the trend chart of the cooling temperature to the display module. The display module is further configured to receive and display the trend chart of the slurry mixing temperature and the trend chart of the cooling temperature.

The advantages of this setting are as follows: in the above solution, the trend chart generated can directly display the use status of the overall equipment to improve the effectiveness of the overall equipment. Moreover, it is conducive to data collection and data research, so as to improve the efficiency of producing the product.

Further, the processing module is configured to compare the configuration information with the status information, and generate the alarm information when the existing water quantity is greater than the water addition amount or when the slurry mixing temperature is greater than the target temperature or when the slurry discharge quantity is greater than the slurry separating mass, and then send the alarm information to the display module. The display module is further configured to receive and display the alarm information.

The advantages of this setting are as follows: in the above solution, the use status of the equipment can be read and compared in real time to obtain the status information of the system, and meanwhile, the status information of the system can be displayed in the display module, so as to issue an alarm to the user.

Further, the electrical control system for slurry mixing further includes an alarm module. The alarm module is configured to receive the alarm information and control an alarm device to operate. The processing module is further configured to send the alarm information to the alarm module.

The advantages of this setting are as follows: after the alarm information is generated, the alarm module is configured to cause an alarm to activate in time to provide a warning, thereby avoiding the waste of resources and improving the efficiency of the system.

Further, the processing module is further configured to generate the manual control information when the action command is detected and to send the manual control information to the alarm module. The alarm module is configured to receive the manual control information and to control the alarm device to cease.

The advantages of this setting are as follows: in the above solution, when the manual control is performed, the occurrence of the alarm is avoided, thereby avoiding a reduction of efficiency of the operation. The manual control information here is generated as soon as the action command is detected, and the subsequent manual control information generated will not be cancelled because of the former one, so as to avoid a missed detection.

Further, the alarm module is further configured to control the alarm device to start to operate one minute after receiving the manual control information.

The advantages of this setting are as follows: in the above solution, the slurry is prevented from being continuously discharged under not manual operation for a long time, so as to avoid the waste of resources. Based on the feeding speed of the equipment, a delay of one minute is set to send an alarm in time to avoid the waste of resources. After receiving the manual control information for the next time, the alarm device will cease. This configuration is simple, easy to implement, and has significant utility.

BRIEF DESCRIPTION OF THE DRAWINGS

FIGURE is a principle block diagram of an embodiment of the present invention.

DETAILED DESCRIPTION OF THE EMBODIMENTS

Referring to FIGURE, an electrical control system for slurry mixing is disclosed, including the processing module 101, the input module 103, the display module 102 and the inspection module 104. Specifically, the input module 103 is configured to input the configuration information and send an action command and the configuration information to the processing module 101, the inspection module 104 is configured to obtain the status information and send the status information to the processing module 101; the processing module 101 is configured to receive the configuration information and the action command from the input module 103 and the status information from the inspection module 104, form a production action according to the configuration information or the action command, and then send the configuration information, the action information and the status information to the display module 102; the display module 102 is configured to receive the configuration information, the action information and the status information, and display the configuration information, the action information and the status information. The advantages of this setting are as follows: the electrical control system for slurry mixing can effectively realize the control of the slurry mixing device and play an effective supervision role, which can reduce labor costs and is also easy to operate and use.

The configuration information includes a heating temperature, a target temperature, a slurry separating mass and a water addition amount. The action command includes an oil injection instruction, a water adding instruction, a heating instruction, a slurry separating instruction, a cleaning instruction, a cooling stirring instruction and a slurry mixing stirring instruction. The status information includes an existing water quantity, a slurry mixing temperature, a cooling temperature and a slurry discharge quantity. The advantages of this setting are as follows: in the above solution, the heating temperature refers to the water bath temperature or the oil bath temperature; the target temperature refers to the temperature reached by the material in the stirring cavity; the slurry separating mass refers to the mass of the slurry discharged into the slurry feeding tank after the slurry mixing is completed; the water addition amount refers to the mass of water that needs to be added in the slurry mixing process; the oil injection instruction refers to the starting of adding the heating oil or the stopping of adding the heating oil; the water adding instruction refers to the starting of adding the water or the stopping of adding the water; the heating instruction refers to the starting of heating the electric heating rod or the stopping of heating the electric heating rod; the slurry separating instruction refers to the opening of the valve to separate the slurry or the closing of the valve to stop separating the slurry; the cleaning instruction refers to the starting or stopping of the cleaning ball; the cooling stirring instruction refers to the starting of cooling and the stopping of cooling; the slurry mixing stirring instruction refers to the starting of slurry mixing and stirring and the stopping of slurry mixing and stirring; the existing water quantity refers to the mass of the added water; the slurry mixing temperature refers to the temperature of the slurry in the slurry mixing tank; the cooling temperature refers to the temperature of the slurry in the slurry feeding tank; the slurry discharge quantity refers to the mass of the slurry discharged into the slurry feeding tank.

The processing module 101 is further configured to generate a trend chart of the slurry mixing temperature according to the slurry mixing temperature and generate a trend chart of the cooling temperature according to the cooling temperature, and then send the trend chart of the slurry mixing temperature and the trend chart of the cooling temperature to the display module 102. The display module 102 is further configured to receive and display the trend chart of the slurry mixing temperature and the trend chart of the cooling temperature. The advantages of this setting are as follows: in the above solution, the trend chart generated can directly display the use status of the overall equipment to improve the effectiveness of the overall equipment. Moreover, it is conducive to data collection and data research, so as to improve the efficiency of producing the product.

The processing module 101 is configured to compare the configuration information with the status information, and generate the alarm information when the existing water quantity is greater than the water addition amount or when the slurry mixing temperature is greater than the target temperature or when the slurry discharge quantity is greater than the slurry separating mass, and then send the alarm information to the display module 102. The display module 102 is further configured to receive and display the alarm information. The advantages of this setting are as follows: in the above solution, the use status of the equipment can be read and compared in real time to obtain the status information of the system, and meanwhile, the status information of the system can be displayed in the display module, so as to issue an alarm to the user.

Further, the electrical control system for slurry mixing further includes the alarm module 105. The alarm module 105 is configured to receive the alarm information and control the alarm device to operate. The processing module 101 is further configured to send the alarm information to the alarm module 105. The advantages of this setting are as follows: after the alarm information is generated the alarm module 105 is configured to cause an alarm to activate in time to provide a warning, thereby avoiding the waste of resources and improving the efficiency of the system.

The processing module 101 is further configured to generate the manual control information when the action command is detected and then send the manual control information to the alarm module 105. The alarm module 105 receives the manual control information and controls the alarm device to cease. The advantages of this setting are as follows: in the above solution, when the manual control is performed, the occurrence of the alarm is avoided, thereby avoiding a reduction of efficiency of the operation. The manual control information here is generated as soon as the action command is detected, and the subsequent manual control information generated will not be cancelled because of the former one, so as to avoid a missed detection.

The alarm module 105 is further configured to control the alarm device to start to operate one minute after receiving the manual control information. The advantages of this setting are as follows: in the above solution, the slurry is prevented from being continuously discharged under no manual operation for a long time, so as to avoid the waste of resources. Based on the feeding speed of the equipment, a delay of one minute is set to send an alarm in time to avoid the waste of resources. After receiving the manual control information for the next time, the alarm device will cease. This configuration is simple, easy to implement, and has significant utility.

The above embodiment is only a preferred embodiment of the present invention and cannot be used to limit the protective scope of the present invention. Therefore, the equivalent changes made according to the protective scope of the present invention, for example, equivalent products with similar processes and similar structures shall fall within the protective scope of the present invention.

What is claimed is:

1. An electrical control system for slurry mixing, comprising a processing module, an input module, a display module and an inspection module; wherein,
   the input module is configured to input configuration information and an action command, and send the action command and the configuration information to the processing module;
   the inspection module is configured to obtain status information and send the status information to the processing module;
   the processing module is configured to receive the configuration information and the action command from the input module and the status information from the inspection module, form a production action according to the configuration information or the action command, and send the configuration information, action information and the status information to the display module; and
   the display module is configured to receive the configuration information, the action information and the status information, and display the configuration information, the action information and the status information;
   wherein,
   the configuration information comprises a heating temperature, a target temperature, a slurry separating mass and a water addition amount;
   the action command comprises an oil injection instruction, a water adding instruction, a heating instruction, a slurry separating instruction, a cleaning instruction, a cooling stirring instruction and a slurry mixing stirring instruction; and
   the status information comprises an existing water quantity, a slurry mixing temperature, a cooling temperature and a slurry discharge quantity;
   wherein, the processing module is further configured to generate a trend chart of the slurry mixing temperature according to the slurry mixing temperature and generate a trend chart of the cooling temperature according to the cooling temperature, and then send the trend chart of the slurry mixing temperature and the trend chart of the cooling temperature to the display module; the display module is further configured to receive and display the trend chart of the slurry mixing temperature and the trend chart of the cooling temperature.

2. The electrical control system for slurry mixing according to claim 1, wherein, the processing module is configured to compare the configuration information with the status information, and generate alarm information when the existing water quantity is greater than the water addition amount or when the slurry mixing temperature is greater than the target temperature or when the slurry discharge quantity is greater than the slurry separating mass, and then send the alarm information to the display module; the display module is further configured to receive and display the alarm information.

3. The electrical control system for slurry mixing according to claim 2, further comprising an alarm module, wherein the alarm module is configured to receive the alarm information and control an alarm device to operate; the processing module is further configured to send the alarm information to the alarm module.

4. The electrical control system for slurry mixing according to claim 3, wherein, the processing module is further configured to generate manual control information when the action command is detected and send the manual control information to the alarm module; the alarm module is configured to receive the manual control information and control the alarm device to cease.

5. The electrical control system for slurry mixing according to claim 1, wherein, the processing module is configured to compare the configuration information with the status information, and generate alarm information when the existing water quantity is greater than the water addition amount or when the slurry mixing temperature is greater than the target temperature or when the slurry discharge quantity is greater than the slurry separating mass, and then send the alarm information to the display module; the display module is further configured to receive and display the alarm information.

6. The electrical control system for slurry mixing according to claim 5, further comprising an alarm module, wherein the alarm module is configured to receive the alarm information and control an alarm device to operate; the processing module is further configured to send the alarm information to the alarm module.

7. The electrical control system for slurry mixing according to claim 6, wherein, the processing module is further configured to generate manual control information when the action command is detected and send the manual control information to the alarm module; the alarm module is configured to receive the manual control information and control the alarm device to cease.

8. The electrical control system for slurry mixing according to claim 7, wherein, the alarm module is further configured to control the alarm device to start to operate one minute after receiving the manual control information.

9. An electrical control system for slurry mixing, comprising a processing module, an input module, a display module and an inspection module;
wherein,
the input module is configured to input configuration information and an action command, and send the action command and the configuration information to the processing module;
the inspection module is configured to obtain status information and send the status information to the processing module;
the processing module is configured to receive the configuration information and the action command from the input module and the status information from the inspection module, form a production action according to the configuration information or the action command, and send the configuration information, action information and the status information to the display module; and
the display module is configured to receive the configuration information, the action information and the status information, and display the configuration information, the action information and the status information;
wherein,
the configuration information comprises a heating temperature, a target temperature, a slurry separating mass and a water addition amount;
the action command comprises an oil injection instruction, a water adding instruction, a heating instruction, a slurry separating instruction, a cleaning instruction, a cooling stirring instruction and a slurry mixing stirring instruction; and
the status information comprises an existing water quantity, a slurry mixing temperature, a cooling temperature and a slurry discharge quantity;
wherein, the processing module is configured to compare the configuration information with the status information, and generate alarm information when the existing water quantity is greater than the water addition amount or when the slurry mixing temperature is greater than the target temperature or when the slurry discharge quantity is greater than the slurry separating mass, and then send the alarm information to the display module; the display module is further configured to receive and display the alarm information;
wherein the electrical control system further comprises an alarm module, wherein the alarm module is configured to receive the alarm information and control an alarm device to operate; the processing module is further configured to send the alarm information to the alarm module;
wherein, the processing module is further configured to generate manual control information when the action command is detected and send the manual control information to the alarm module;
the alarm module is configured to receive the manual control information and control the alarm device to cease;
wherein, the alarm module is further configured to control the alarm device to start to operate one minute after receiving the manual control information.

* * * * *